July 16, 1929.  A. H. ANTRAINER ET AL  1,721,171
HYDRAULIC STEERING MECHANISM
Filed May 18, 1928
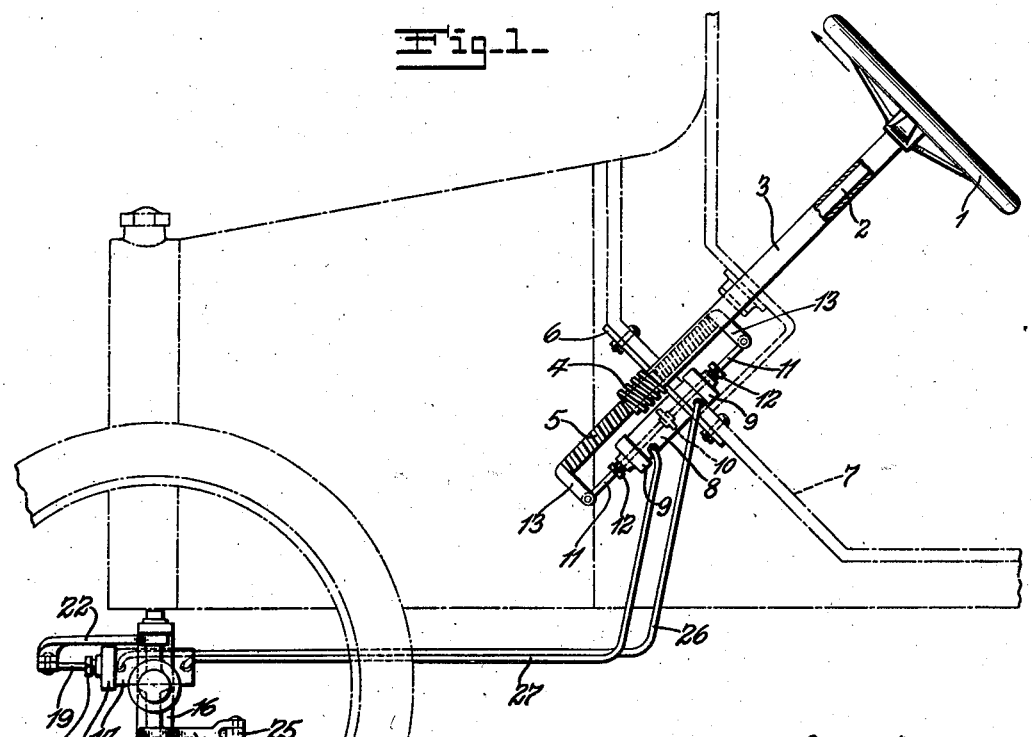
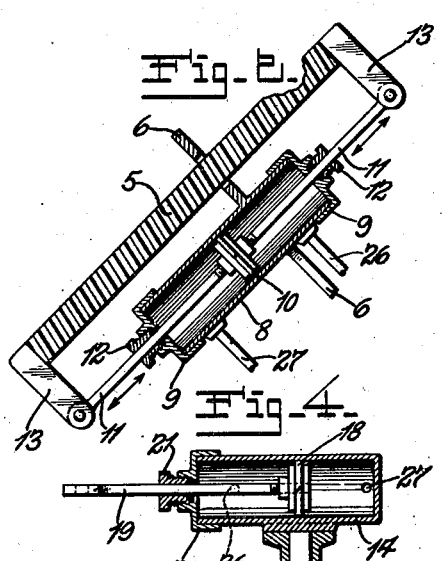
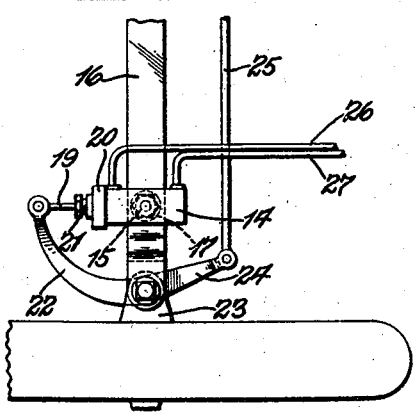
Inventors.
Arthur H. Antrainer,
Daniel B. Ryan,
by Rippey & Kingsland
Their Attorneys.

Patented July 16, 1929.

1,721,171

UNITED STATES PATENT OFFICE.

ARTHUR H. ANTRAINER AND DANIEL B. RYAN, OF ST. LOUIS, MISSOURI.

HYDRAULIC STEERING MECHANISM.

Application filed May 18, 1928. Serial No. 278,668.

This invention relates to hydraulic steering mechanisms for motor vehicles.

An object of the invention is to provide a highly efficient and simplified hydraulic steering mechanism capable of easy operation and possessing all of the advantages obtainable by the embodiment of the invention herein shown and described.

Other objects will appear from the following description, reference being made to the drawing in which Fig. 1 is a side elevation of our improved hydraulic steering mechanism in connection with associated parts of an automobile.

Fig. 2 is a sectional view of the piston associated directly with the steering rod.

Fig. 3 is a plan view of that portion of the device that is mounted directly upon the front axle of the automobile.

Fig. 4 is a vertical longitudinal sectional view of the cylinder that is mounted on the front axle.

The steering wheel 1 is attached to the upper end of a steering post 2 rotatively mounted in the column 3. The lower end of the post 2 is modified from usual construction by providing thereon a worm 4 which is in constant mesh with a rack 5. The rack 5 is mounted to slide in a plane parallel with the post 2, being operative in a guide 6 attached to the floor 7 of the automobile body and thereby held in permanent engagement with the worm 4 for longitudinal movements thereby.

As shown, the guide 6 is in integral connection with a cylinder 8 having removable ends 9. The axis of the cylinder 8 is parallel with the rack 5 and with the post 2 and encloses a piston 10. Rods 11 extend from connection with opposite sides of the piston 10 through the cylinder ends 9 which are equipped with appropriate packing glands 12 to prevent leakage of the contents of the cylinder. The outer ends of the rods 11 are attached to arms 13 rigid with the ends of the rack 5 so that when said rack is moved longitudinally in either direction by rotation of the worm 5 by the steering post 2 the piston 10 will be moved thereby.

A cylinder 14 is provided with an arm 15. The cylinder 14 is mounted on the front axle 16 and the arm 15 extends through said axle, the parts being secured in this relationship by a nut 17 screwed on the lower end of said arm 15. A piston 18 is mounted in the cylinder 14 and has a connecting rod 19 projecting through the removable end 20 of the cylinder, a packing gland 21 being provided to prevent leakage of the contents of the cylinder. The front end of the connecting rod 19 is pivoted to the front end of an arm or lever 22 rigid with one of the steering knuckles 23. The steering knuckle 23 is provided with the usual arm 24 which is connected with a similar arm (not shown) for the front wheel at the opposite side of the vehicle by a connecting rod 25.

When the front wheels are positioned for straight driving the piston 18 is about midway of the ends of the cylinder 14 and is capable of movement in either direction. A tube 26 forms communication from that part of the cylinder 8 above the piston 10 to that part of the cylinder 16 in front of the piston 18; and a similar tube 27 forms communication from the cylinder 8 below the piston 10 to the cylinder 14 at the rear of the piston 18.

In operation, both cylinders 8 and 14 and both tubes 26 and 27 being completely filled with a suitable liquid substance, the vehicle may be easily controlled and steered by control of the steering wheel 1. When the steering wheel 1 is turned toward the right relative to the operator the rack 5 will be moved upwardly, thus moving the piston 10 upwardly and forcing the liquid from the upper end of the cylinder 8 through the tube 26 into the cylinder 14 in front of the piston 8. This will force the piston 8 toward the rear, causing the arm or lever 22 to swing inwardly and thus turn both front wheels of the vehicle toward the right. Turning of the steering wheel 1 in the opposite direction will reverse this operation.

From the foregoing it will be seen that we have provided a highly simplified and efficient hydraulic steering mechanism comprising comparatively few parts mounted and assembled in a relationship to obtain ease of operation and at the same time control the vehicle positively.

The construction and arrangement of the parts may be varied within equivalent limits without departure from the nature and principle of the invention.

We do not restrict ourselves unessentially, but what we claim and desire to secure by Letters Patent is:

1. In a steering mechanism, a rotative steering post, a worm rigid on said post, a rack, means for supporting said rack in permanent engagement with said worm for movements by said worm parallel with said post, a cylinder parallel with said post, a piston in said cylinder, means connecting opposite ends of said rack with opposite ends of said piston, a second cylinder, a piston mounted in said cylinder, steering devices in connection with said second piston, and tubes forming communications from opposite end portions of said first cylinder to opposite end portions of said second cylinder at opposite sides of said pistons.

2. A steering device comprising a worm, means for rotating said worm, a cylinder parallel with the axis of said worm, a rack, means for supporting said rack in permanent engagement with said worm for longitudinal sliding movements parallel with the axis of said worm, a piston in said cylinder, connections from opposite ends of said piston to opposite ends of said rack, a second cylinder, a piston in said second cylinder, steering connections operatively connecting with said second piston, and tubes forming communications between opposite end portions of said cylinders at opposite sides of said pistons.

3. A steering device comprising a worm, a rack operative longitudinally in opposite directions by said worm, means holding said rack in permanent mesh with said worm, a cylinder, a piston in said cylinder, connections from opposite ends of said piston to opposite ends of said rack, a second cylinder, a piston in said second cylinder, means for operating steering devices by said second piston, and means for moving said second piston in opposite directions by said first piston.

4. A steering device comprising a worm, a rack operative longitudinally in opposite directions by said worm, means for holding said rack in permanent mesh with said worm, a cylinder parallel with the axis of said worm, connections from opposite ends of said piston to opposite ends of said rack for operating said piston by said rack, steering devices, and means for operating said steering devices by said piston.

ARTHUR H. ANTRAINER.
DANIEL B. RYAN.